United States Patent

[11] 3,634,058

| [72] | Inventor | Roy W. Yunker<br>Bridgeport, W. Va. |
|---|---|---|
| [21] | Appl. No. | 3,383 |
| [22] | Filed | Jan. 16, 1970 |
| [45] | Patented | Jan. 11, 1972 |
| [73] | Assignee | PPG Industries, Inc.<br>Pittsburgh, Pa. |

[54] COOLER FOR VERTICAL GLASS SHEET DRAWING MACHINE
2 Claims, 1 Drawing Fig.

[52] U.S. Cl.................................................. 65/196,
65/85, 65/204, 65/348, 65/356
[51] Int. Cl...................................................... C03b 15/04
[50] Field of Search............................................ 65/83, 85,
204, 348, 355, 356

[56] References Cited
UNITED STATES PATENTS
2,991,590  7/1961  Brichard.................... 65/204
FOREIGN PATENTS
806,884  6/1951  Germany...................... 65/204

Primary Examiner—Arthur D. Kellogg
Attorney—Chisholm and Spencer

ABSTRACT: Disclosed is a cooler for use in a vertical drawing process for making glass sheet that comprises baffle or honeycomb means welded or otherwise positioned in thermally conducting relationship with the front sides (toward the glass sheet) of the main coolers, for not only suppressing vertical downdrafts from the front sides of the main coolers that tend to cause distortion of the sheet but also for improving the efficiency of the cooling.

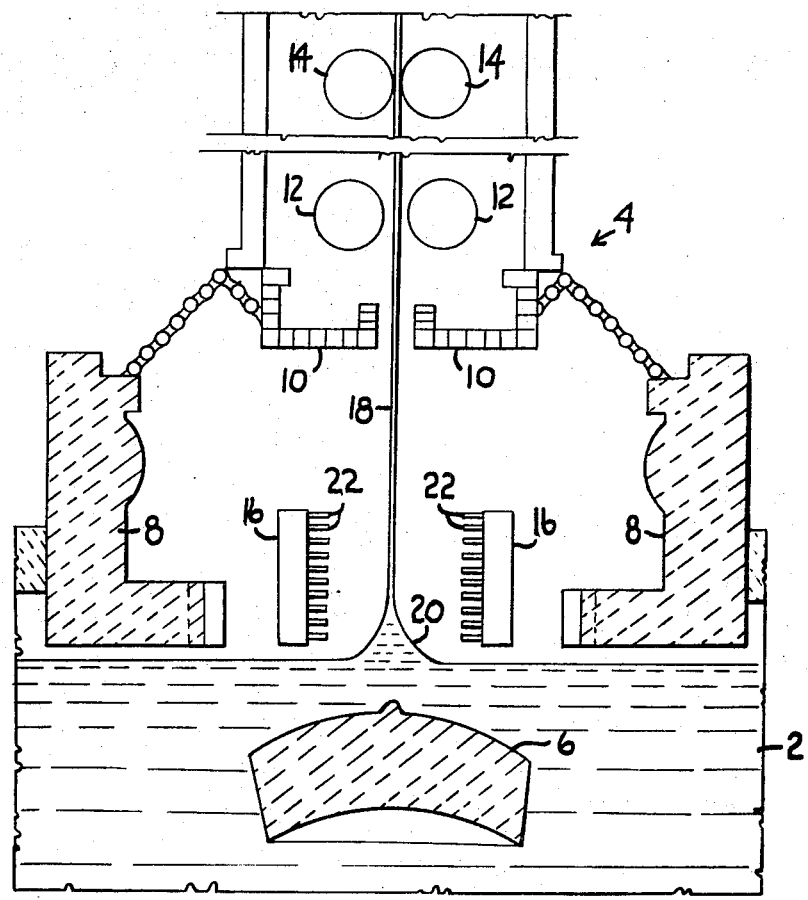
INVENTOR
ROY W. YUNKER

3,634,058

COOLER FOR VERTICAL GLASS SHEET DRAWING MACHINE

BACKGROUND OF THE INVENTION

1. Field of the Invention

This invention relates to a cooler for use in a process for the vertical drawing of glass sheet.

2. Description of the Prior Art

It is known, for example, from Belgian Pat. No. 436,092, to provide means for suppressing downdraft cold air from the surfaces of a cooler in a vertical drawing process for the production of glass sheet, in order to reduce the amount of distortion in the product glass. In the invention of that patent, the drawing machine is provided with cooling pipes that have associated with them screens that are disposed on the pipes or in their vicinity to restrain vertical movement of formed air streams, and this is interpreted as relating to the downdrafts that proceed vertically from the front surfaces of the main coolers that are used in connection with a Pennvernon drawing machine for the production of window glass. However, nothing contained in the above-mentioned patent discloses the substantial improvement in the operation of the cooler that is obtained when baffle plates or a honeycomb of suitable characteristics is welded to or otherwise placed in thermally conducting relationship with the front surfaces (toward the sheet) of the main coolers of a drawing machine for the production of window glass.

SUMMARY OF THE INVENTION

Disclosed is a cooler for use in a vertical drawing process that comprises baffle or honeycomb means welded or otherwise in thermally conducting relationship with the front sides (toward the glass sheet) of the main coolers, not only for suppressing vertical downdrafts from the front sides of the main coolers that tend to cause distortion of the sheet but also for improving the efficiency of the cooling.

BRIEF DESCRIPTION OF THE DRAWINGS

A complete understanding of the invention may be obtained from the foregoing and following description thereof, taken together with the accompanying drawings, in which:

the sole FIGURE is a schematic representation of a vertical drawing machine and its associated tank, provided with main coolers in accordance with the instant invention.

DESCRIPTION OF THE PREFERRED EMBODIMENTS

Referring now to the drawing, there is shown schematically a portion of a tank containing molten glass 2 and, above it, a drawing machine indicated generally at 4. The apparatus comprises the use of a drawbar 6, L-blocks 8, catchpans 10, and rolls 12, 14. The main coolers are indicated at 16. The parts mentioned above may be considered as conventional.

In accordance with the invention, there are provided, on the front surfaces of the coolers 16 (toward the sheet 18 emerging from meniscus 20), a plurality of baffles 22 or the like. The baffles 22 or the like are welded or brazed or otherwise brought into thermally conducting relationship with the front surfaces of the main coolers 16. The baffles 22 may be made of AISI-type 430 stainless steel, about 0.005 to 0.020 inch thick, and spaced at intervals of 0.25 to 1.0 inch down the front surfaces on the coolers 16, as shown. Alternatively, there may be used honeycomb material (similarly made of stainless steel or the like of about the same thickness as the above-mentioned baffles). When honeycomb material is used, the honeycomb may be of 0.25 to 1.0 inch thick, with a cell size of 0.25 to 1.0 inch square.

It is important that the baffles or honeycomb material be in thermally conductive relationship with the main front surfaces of the coolers 16. When this is the case, there is developed a situation wherein the ends of the baffles or the portions of the honeycomb that are nearest to the sheet are at a temperature of about 650° to 700° F., whereas the rear ends of the baffles or honeycombs are at about the same temperature as the front faces of the coolers 16, namely, about 200° F. The increased surface area tends to increase the efficiency of the cooler, and at the same time, since the outer (near the sheet) ends of the baffles or honeycomb material are at about the same temperature as the air that surrounds them, there is a reduction in the amount of thermally induced air circulation in the system. This means that there is a substantial tendency toward lessening of the development of downdrafts of cold air that would otherwise emanate from the front surfaces of the cooler 16 and tend to affect detrimentally the quality of the glass issuing from the meniscus 20 as respects its distortion characteristics.

The effect indicated above, i.e., a substantial (at least 450° F.) temperature gradient within the baffles or honeycomb members, such that the portions of those that are nearest to the glass are hot but the portions of them nearest to the cooler are cold, can be obtained only when the baffle or honeycomb material is relatively thin, as indicated above. The thickness of the sheet material of which the baffles or honeycombs are made is to be chosen with this object in mind. The suitable stainless steels and other metals and alloys that have adequate high-temperature strength and high-temperature oxidation resistance for use in this invention differ somewhat in their thermal conductivity, and this factor must also be taken into account. If the material used is of greater thermal conductivity, a smaller thickness should be used, or else the temperature gradient will not be great enough. On the other hand, if the material used is of lower thermal conductivity, the thickness must be increased somewhat, to maintain an adequate heat flux and nor impair unduly the effectiveness of the cooling operation.

One example comprises welding, to the hot surfaces of main coolers of a 100-inch drawing machine, AISI Type 430 stainless steel honeycomb material (thickness 0.008 inch, depth 1 inch, cell size 0.25 inch), with the main coolers being set about 7 to 8 inches from the sheet and 0.5 to 1.0 inch above the bath. The main coolers are about 10 inches high and are made of conduit 1.5 inches square, through which cooling water is circulated.

It is also within the scope of the instant invention to achieve preferential cooling effects in various area across the width of the sheet by varying, as desired, the length of the baffles or the depth of the honeycomb cells.

I claim:

1. An apparatus for drawing sheet glass from a mass of molten glass wherein vertical downdrafts of gas streams normally flow over a major surface of the glass sheet in a region in said apparatus where the glass in said sheet is in a softened state and produce defects in said sheet, said apparatus comprising a tank for containing a bath of molten glass, a drawbar mounted in said tank in a location such that it may be totally submerged in the molten glass contained in said tank, and a drawing machine positioned above said tank and over said drawbar, the improvement comprising:

a cooler mounted in said drawing machine in a region closely adjacent the surface of the molten glass in said apparatus and the meniscus formed by the withdrawal of a glass sheet from the bath of molten glass, means to maintain the cooler within a predetermined temperature range, said cooler being spaced from the adjacent major surface of the glass sheet being formed and extending transversely a substantial amount of the width of the said sheet and vertically a substantial amount of the area of the said sheet wherein the glass is in a softened state, and a plurality of rows of a plurality of outwardly extending baffle members each having an end mounted in heat-conductive relation on the surface of the cooler opposed to a major surface of the glass sheet adjacent thereto and having terminal ends located a short distance from said major surface of said glass sheet, said baffle members each being formed of a material having high resistance to oxidation at the temperatures in said apparatus and high thermal conductivity, each of said baffle members being of a thickness and length sufficient to maintain a temperature gradient between the outer terminal end thereof and the end secured to said cooler of at least 450° F., and reduce the vertical downdraft of gas streams normally flowing over the major surface of said glass sheet in the region occupied by said cooler and baffle members until the distortion of said sheet produced by said gas streams is reduced.

2. The apparatus of claim 1 wherein said baffle members have portions extending transversely toward and connecting with adjacent baffle members to form a honeycomb baffle on said cooler.

* * * * *